United States Patent [19]

Hisatake et al.

[11] Patent Number: 4,998,489
[45] Date of Patent: Mar. 12, 1991

[54] EMBROIDERING MACHINES HAVING GRAPHIC INPUT MEANS

[75] Inventors: Michio Hisatake; Takeshi Kongo; Hidenori Sasako; Yoshikazu Ebata, all of Tokyo, Japan

[73] Assignee: Janome Sewing Machine Industry Co., Ltd., Tokyo, Japan

[21] Appl. No.: 345,613

[22] Filed: Apr. 28, 1989

[30] Foreign Application Priority Data

Apr. 28, 1988 [JP] Japan ................................ 63-104043

[51] Int. Cl.⁵ .......................... D05C 9/04; D05B 21/00
[52] U.S. Cl. ................................ 112/103; 112/121.12; 364/470
[58] Field of Search ............... 112/103, 121.12, 121.11, 112/266.1, 262.3, 457, 445, 454, 102, 86, 78, 98, 119, 80.23; 364/470

[56] References Cited

U.S. PATENT DOCUMENTS

| 4,335,667 | 6/1982 | Beckerman et al. ................ 112/445 |
| 4,622,907 | 11/1986 | Kimura .............................. 112/103 X |
| 4,660,484 | 4/1987 | Yasui .......................... 112/121.12 X |
| 4,748,920 | 6/1988 | Stutznacker ............... 112/121.12 X |
| 4,763,586 | 8/1988 | Takenoya et al. .................. 112/103 |
| 4,849,902 | 7/1989 | Yokoe et al. ................. 112/80.23 X |
| 4,860,675 | 8/1989 | Brower et al. ...................... 112/119 |

Primary Examiner—Peter Nerbun
Attorney, Agent, or Firm—Dann, Dorfman, Herrell and Skillman

[57] ABSTRACT

An embroidering machine is provided with a display section which is retractable within a machine housing and can be pulled to an operational position when in use for select/input operation. Several kinds of select/input operation can be made with a single display means, by suitably changing and selecting the display mode. Select/input operation is made by plotting an appropriate portion seen in the display, reducing to a great extent erroneous operation with a visual support.

4 Claims, 9 Drawing Sheets

EMBROIDERING MACHINES HAVING GRAPHIC INPUT MEANS

BACKGROUND OF THE INVENTION

This invention relates to an embroidering machine having graphic input means.

With the conventional embroidering machines, stitch control data for producing characters on a fabric are in advance stored in memory means, a selective one of which can be read out therefrom by suitable operation to designate a corresponding code number of four figures, for example. The operator will be required to look for the code number of a character desired to be stitched in reference to a list book, and then to designate the code number by manipulation of a ten key arrangement attached to the machine housing. Apart from such code number searching operation being troublesome, it has often been found that the code number may be input or designated in error.

In order to obviate troublesomeness of the aforementioned operation in reference to the code number list book, it has been proposed that to an embroidering machine is connected a mode-changeable keyboard having a plurality of operating keys, to each key being allocated two or more characters. For example, alphabet "A" in different printing style, including Roman style and Gothic style, can be designated by manipulation of the same key with the operation mode of the keyboard being suitably changed. With this system, the keyboard consisting of input means should be arranged separately from the main body of the embroidering machine, and there will be required a large space for placing the keyboard. It would be troublesome to move this systematic apparatus from one place to another.

When stitching the embroidery pattern, material points for the pattern including at least a starting point from which the designated character series should be commenced and an ending point of the pattern are to be designated beforehand. This has been achieved by marking these points on a fabric, stretching the fabric between an embroidery frame and shifting the embroidery frame so that a stitching needle is directed just toward the starting point. A standard line is also marked on the fabric beforehand and should be set in alignment with an embroidery frame shifting direction in stretching the fabric.

The stitch control data for producing an original design or image can be input through an input device separate from the embroidering machine. An original picture is placed on the input device and respective points lying on the periphery of the image are plotted successively with a light pen. Accordingly, it has been time-consuming and troublesome to prepare the stitch control data for producing the original image.

SUMMARY OF THE INVENTION

It is therefore an object of this invention to provide an embroidering machine capable of eliminating disadvantages which have been found in the conventional embroidering system.

Another object of this invention is to provide a novel embroidering machine easy to operate for producing various types of embroidery stitch patterns.

According to an aspect of this invention there is provided to an embroidering machine having a machine housing, a vertically reciprocated needle supported by the machine housing and carrying a thread, a thread loop-taker cooperating with the needle to form a stitch on a fabric, an embroidery frame for supporting the fabric, means for shifting the embroidery frame with respect to the needle, and memory means for storing embroidery stitch control data for a plurality of patterns including character patterns, the data being selectively and sequentially read out from the memory means to drive the frame shifting means to thereby produce stitches of a selected pattern. The embroidering machine further comprises camera means mounted on the machine housing in opposition to said embroidery frame for taking a picture of the fabric stretched between said embroidery frame, said picture representing positional relation between the fabric and the needle; a graphic display connected to the machine housing, said graphic display being in one of first and second operation modes, said graphic display being operatable in said first operation mode to display a list of stitchable patterns, whereas said graphic display being operatable in said second operation mode to display the picture taken by said camera means; and signal generating means cooperating with said graphic display so that, with a visual image, one or more of desired characters shown on said display can be selected when said graphic display is in said first operation mode, and specific points on the fabric to be actually stitched can be designated when in said second operation mode.

In accordance with another aspect of the invention there is provided an embroidering machine having a machine housing, a vertically reciprocated needle supported by the machine housing and carrying a thread, a thread loop-taker cooperating with the needle to form a stitch on a fabric, an embroidery frame for supporting the fabric, means for shifting the embroidery frame with respect to the needle, and memory means for storing embroidery stitch control data for a plurality of patterns including character patterns, the data being selectively and sequentially read out from the memory means to drive the frame shifting means to thereby produce stitches of a selected pattern, the embroidering machine further comprising a second frame configurated in correspondence with the embroidery frame and replaceable therewith, said second frame carrying a desired original picture thereon; camera means mounted on the machine housing in opposition to said second frame attached to the machine housing for taking a photograph of the original picture, said photograph representing relative position data between the original picture and the needle; a graphic display connected to the machine housing, for displaying thereon said relative position data between the original picture and the needle; and signal generating means cooperable with said graphic display so that specific points to be actually stitched for reproducing the original picture on the fabric can be designated with a visual image.

BRIEF DESCRIPTION OF THE ACCOMPANYING DRAWINGS

Further objects and advantages of this invention can be fully understood from the following detailed description when read in conjunction with the accompanying drawings in which.

DETAILED DESCRIPTION OF PREFERRED EMBODIMENTS

Figure 2:
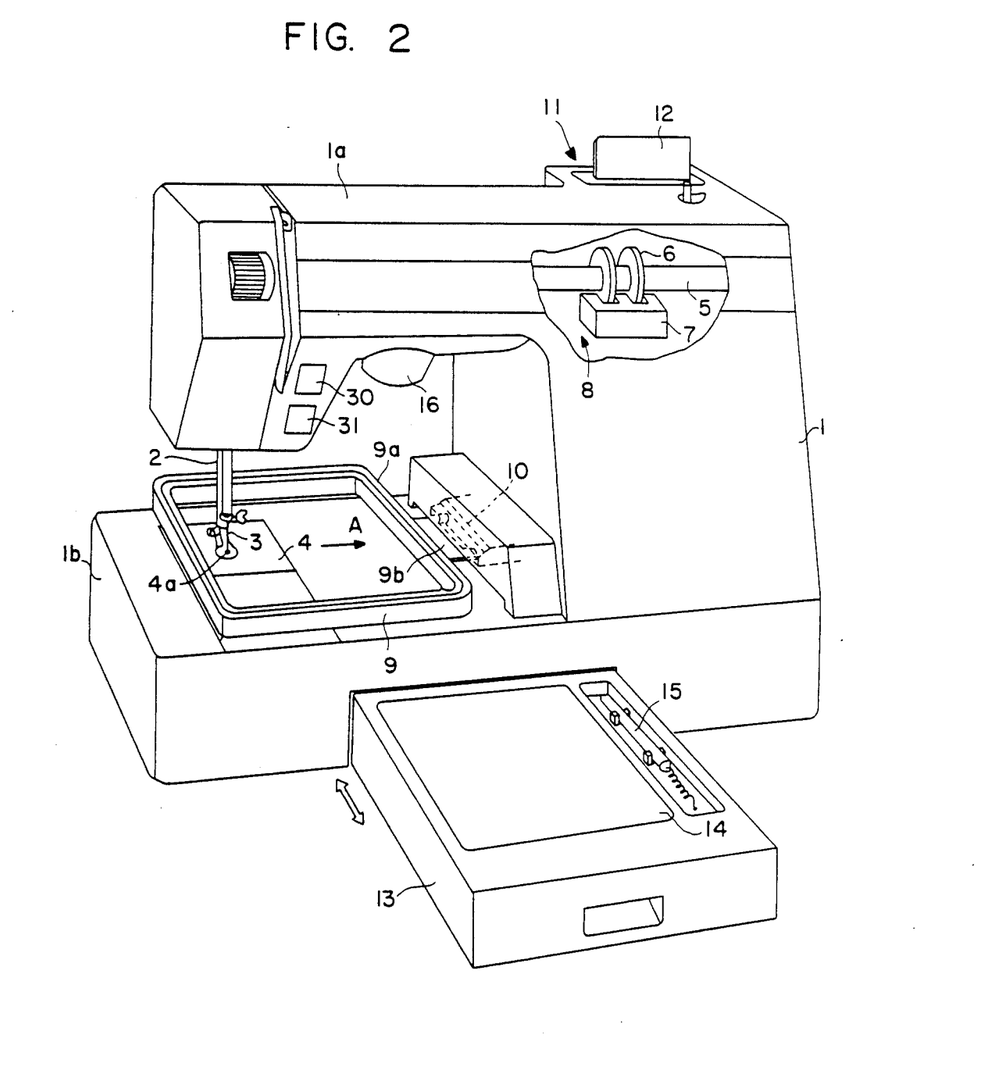
FIG. 2 is a perspective view, partly in broken, illustrating the embroidering machine.

As specifically illustrated in FIG. 2, an embroidering machine embodying the invention has a drive shaft 5 extending through a projecting arm 1a of a machine housing 1. A needle bar 2 is connected to one end of drive shaft 5 so that it is vertically reciprocated in synchronism with rotation of drive shaft 5. To the leading end of needle bar 2 is secured a thread carrying needle 3. A needle plate 4 attached to a machine bed 1b includes a hole 4a vertically aligned to needle 3 for allowing penetration of the needle. Below needle plate 4 is arranged a loop-taker mechanism cooperating with needle 3 to form stitches in a known manner on a fabric stretched between a tanbour 9a of an embroidering frame 9. Frame 9 is supported in parallel with needle plate 3 through mechanical engagement between an extension 9b of frame 9 and a supporting plate 10 slideably mounted to machine housing 1 in horizontal two directions X and Y. Step-wise displacement of frame 9 in X and/or Y directions will occur only when needle 3 is positioned above needle plate 4, which can be detected by means of a needle position sensor generally referred to by a numeral 8. Needle position sensor 8 comprises a pair of rotary plates 6 secured to drive shaft 5 and provided with a plurality of evenly spaced slits (not shown) and a photo interruptor 7 secured to machine housing 1, whereby a phase of drive shaft 5 in one rotation thereof which will govern the needle position in one reciprocation can be photoelectrically detected in a known manner.

Embroidery data are in advance stored in a memory card 12 comprising ROM (read only memory) for producing a plurality of embroidery stitch patterns including alphabetical characters and figures in different printing styles. ROM card 12 can be inserted into an aperture 11a of a reading/writing device 11 mounted in machine housing 1 so that the embroidery data can be selectively read out from ROM card 12 by manual selecting operation to be described later. The embroidery data stored in ROM card 12 includes first display data comprising dot matrix data for representing all stitchable embroidery patterns on a display 14 (to be described later), second display data for representing the selected embroidery pattern on display 14 and peripheral reference data for determining a general shape of the selected pattern of a standard size.

Machine arm 1 is provided with a retractable operation deck 13 including the CRT graphic display 14 and a light pen 15 cooperating with a display to perform select/input operation. In this specific embodiment, display 14 is operatable in several modes and will display thereon different type pictures in different operation modes. Thus, with a single display means, different select/input operation can be made with a visual support. Such multiple operation of display 14 will be hereinlater described in detail.

A television camera 16 is arranged on machine arm 1 in opposition to embroidery frame 9 for taking a picture or photograph of the fabric of an area stretched between frame 9. The picture can be projected onto display 14 for subsequent select/input operation.

Figure 1:
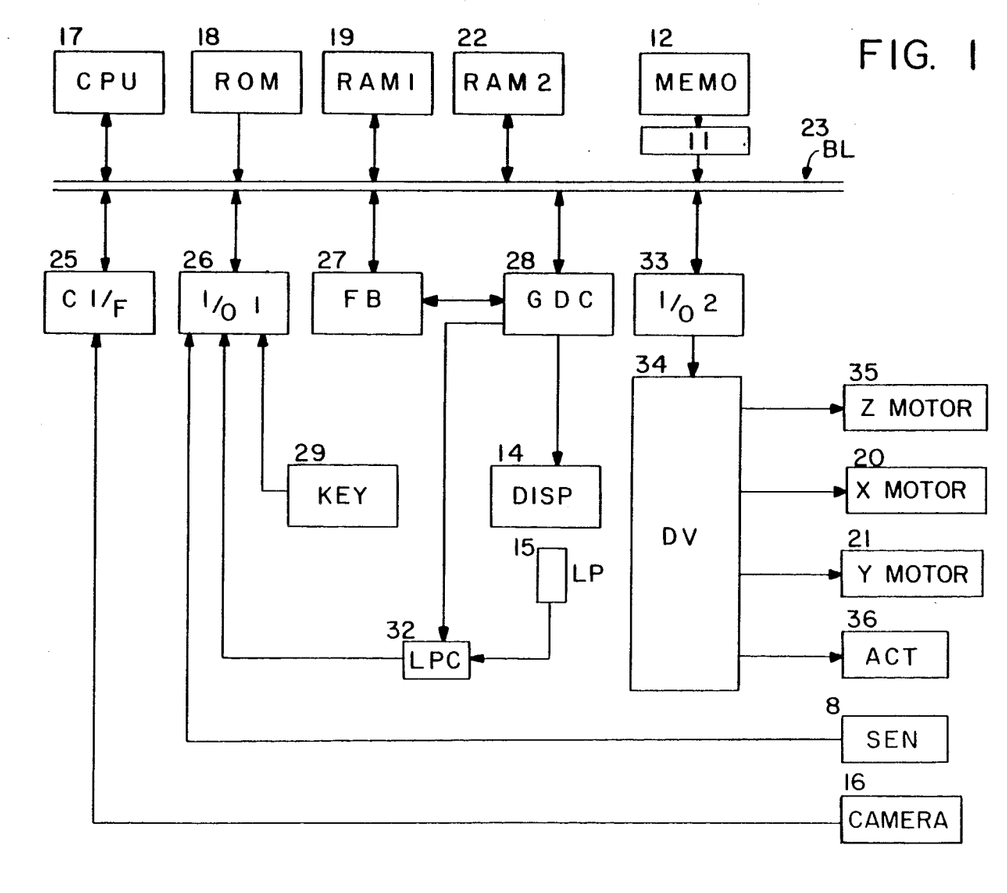
FIG. 1 is a block diagram showing control operation of an embroidering machine embodying the invention.

Now reference should be made to a block diagram of FIG. 1. A microcomputer for controlling operation of the embroidering machine having the aforementioned construction comprises a central processing unit (CPU) 17, a ROM 18 storing embroidery stitch control programs, a first random-access-memory (RAM) 19 for temporaly storing embroidery data which has been read out from ROM card 12 via device 11, a second RAM 22 for storing stitch control data of the selected embroidery pattern which can be prepared from the embroidery data and the stitch control program for controlling step-wise displacement of embroidery frame 4 in each stitch, and a data bus line 23 for transceiving signals between these elements. Needle position sensor 8 is connected via input/output terminals 26 and television camera 16 is connected via a camera interface 25, respectively to data bus line 23.

Also connected is a graphic display controller (GDC) 28 which is provided for preparing an image on a frame buffer memory (FB) 27 in response to a command signal from CPU 17 and converting data in frame buffer memory 27 into a corresponding video signal to be supplied to graphic display (DISP) 14. Operation keys (KEY) 29 including a start switch 30 and a stop switch 31 (FIG. 2) arranged on machine housing 1 will also be connected to data bus line 23 via first input/output terminals 26. Light pen 15 is used for select/input operation on display 14, upon which the coordinates of the designated points will be determined by a light pen controller (LPC) 32 which is also connected to data bus line 23 via first input/output terminals 26. A drive mechanism (DV) 34 is provided for driving X and Y motors 20 and 21 to thereby stepwise shift supporting member 10, and a Z motor 35 is provided to thereby start stitching operation with embroidery machine and an actuator (ACT) 36. The respective elements and constituents of embroidering machine shown in FIG. 1 will be well known themselves and easily available on the market.

Figure 3:
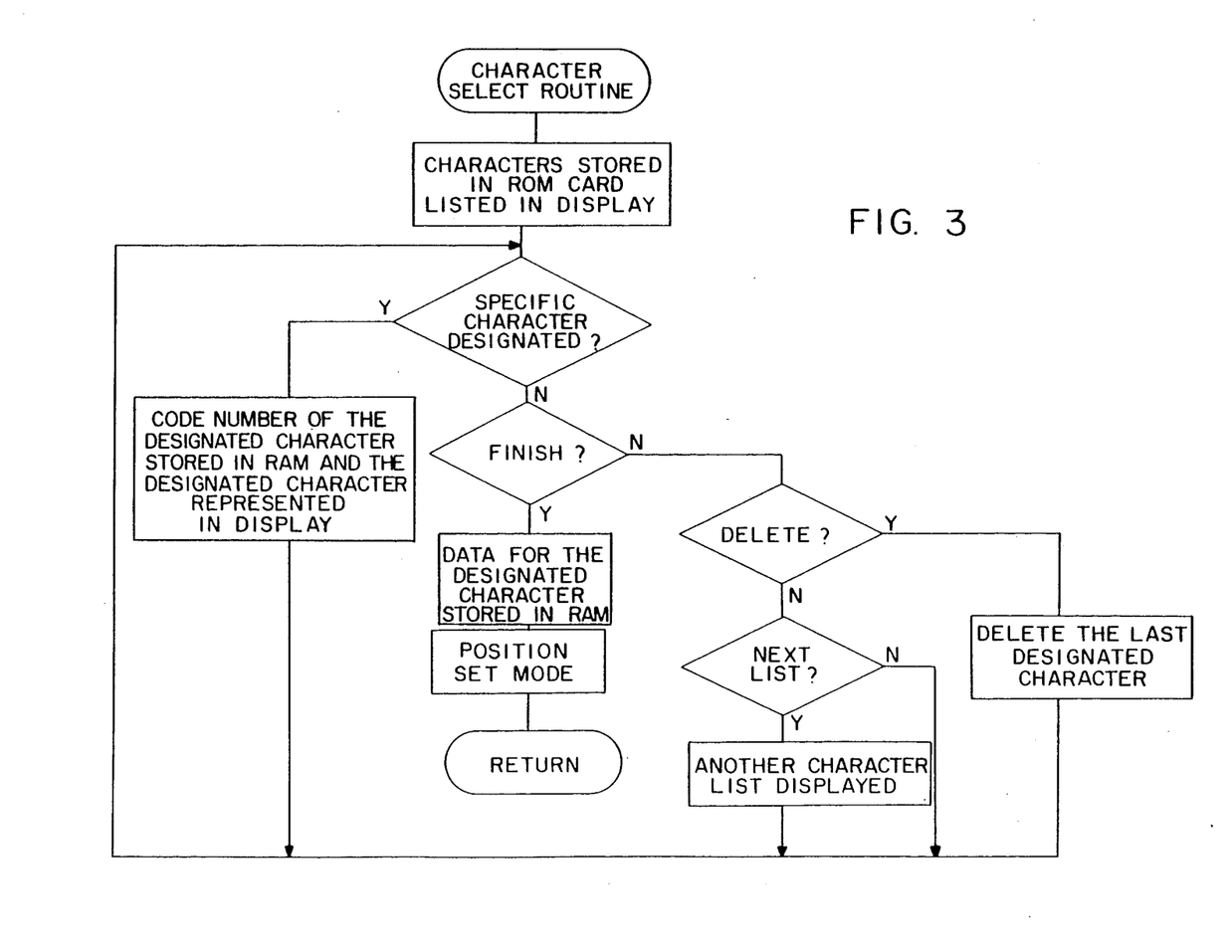
FIG. 3 is a flow chart of the character select routine performed by the embroidering machine.
Figure 4:
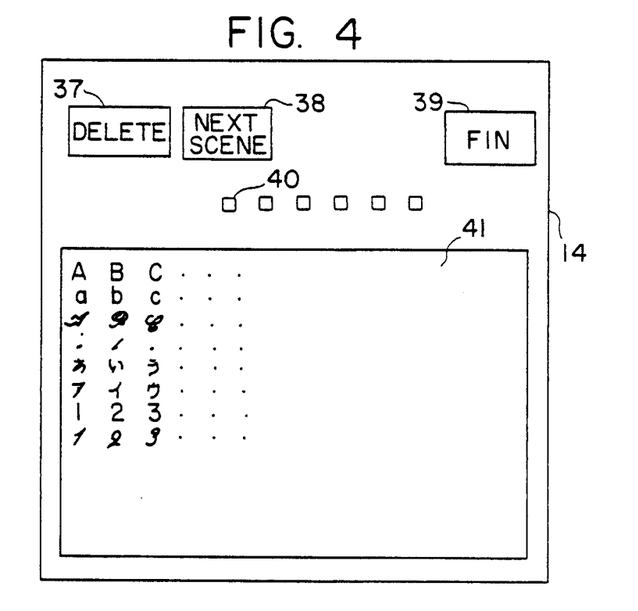
FIG. 4 is a plan view showing a display section of the embroidering machine which can be seen in the character select mode.

With the embroidering machine, an embroidery stitch pattern comprising one or more of characters can be produced on the fabric by utilizing ROM card 12. This will be processed through a sequence of character selecting routines as illustrated in FIG. 3. More particularly, after ROM card 12 has been inserted to device 11 and a mode select switch (not shown) shown on display 14 of operation deck 13 has been operated so that to the embroidering machine is allocated a "character select mode", a plurality of stitchable characters will be listed on display 14. By way of a nonlimitating specific example, as shown in FIG. 4, a table of alphabets and numbers in different styles will be appearing in a character display section 41 of display 14 in this character select mode. There also appear touch keys 37, 38 and 39 for commanding erasure of the selected character, step-up to the next scene and end of the selecting operation respectively. Another section referred to in general by a numeral 40 is provided for representing the selected characters in due order for the purpose of visual check by the operator.

When one of the characters appearing on display section 41 is designated by light pen 15, the code number previously allocated to the character thus designated is registered in first RAM 19. At the same time, the designated character is represented in section 40. After a desired series of characters have been designated by repeating such procedure, "FIN" key 39 is depressed so that the embroidery control data for the designated characters will be read out from ROM card 12 and stored in first RAM 19 in the order of designation. If some character has been erroneously designated, which could be found by the operator while referring to display section 40, "DELETE" key 37 is depressed so that the code number of the last designated character is deleted from RAM 19 and identification thereof in display section 40 disappear. When a desired character is not found in display 41, "NEXT SCENE" key 38 is depressed until a list including the desired character appears in display 41.

Figure 6:
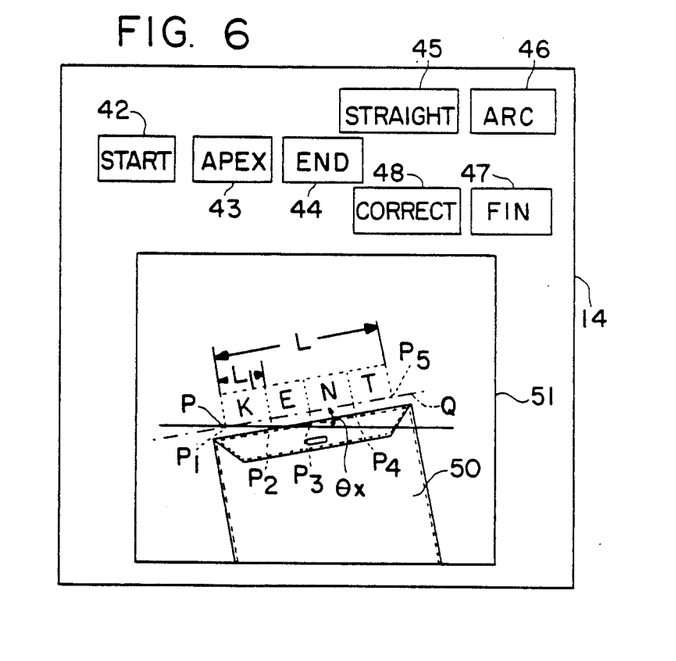
FIG. 6 is a plan view showing a display section which can be seen in the embroidery position set mode.
Figure 7:
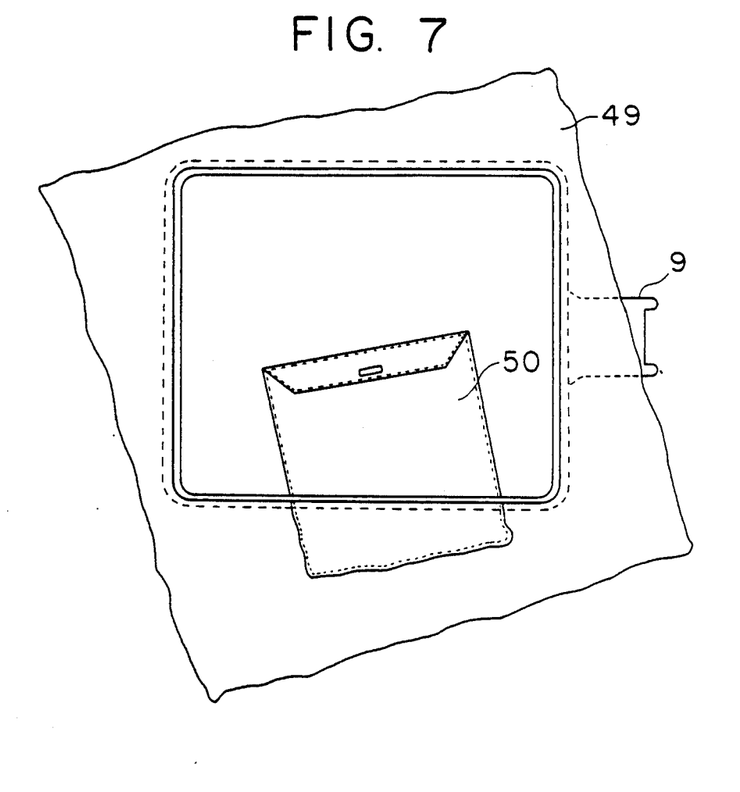
FIG. 7 is a plan view illustrating a fabric stretched between an embroidery frame of the machine.

After "FIN" key 39 has been depressed for transferring the embroidery control data for the designated characters to first RAM 19, display 14 is changed to a position set mode as shown in FIG. 6, position designation keys appear comprising a "START" key 42 for designating a point from which stitching operation of the selected embroidery pattern should be commenced, an "APEX" key 43 for designating a point to be positioned in the apex of the embroidery pattern when produced in an arcuate arrangement and an "END" key 44 for designating a point at which the stitching operation should be terminated. Arrangement of designation keys also appears on display 14, including a "STRAIGHT" key 45 and an "ARC" key 46, one of which will be operated as desired so that the selected embroidery pattern can be produced on the fabric in a straight alignment or in an arcuate arrangement. Further, display 14 includes a "FIN" key 47 for commanding that operation in the position set mode has been completed and a "CORRECT" key 48 for correction of the erroneous input.

A lower space used for display 41 in the former character select mode (FIG. 4) will be replaced by a field 51 representing a blip or picture taken by camera 16.

By way of a nonlimiting specific example, a straight-aligned series of characters "KENT" in Roman style can be stitched on a fabric 49 at a portion above a pocket 50, in a manner described herein under in detail, while referring to FIG. 6. Such series of the characters "KENT" has been designated by appropriate operation of keys arranged on display 14 which was in the character select mode. The stitch control data for producing the same has been stored in first RAM 19.

First, the fabric 49 is stretched between embroidery frame 9. When stretching the fabric 49, no care must be taken for definite positioning of an area to be stitched. More particularly, the area may be positioned not exactly in the center of the field 51. The area may also be inclined with respect to a horizontal standard line which is shown as a solid line in the field 51 in FIG. 6. In this nonlimiting specific example, the area to be stitched which extend above in parallel with an upper edge of pocket 50 has an inclination angle of $\theta x$.

In the positioning mode, in step No. 1, stepping motors 20 and 21 are so driven as to shift embroidery frame 9 toward a predetermined starting position in accordance with a program stored in ROM 18. By way of nonlimiting example, the starting position of embroidery frame 9 has been so determined that the center of frame has coordinates (50, 0), in which position embroidery frame 9 is in the center along the longitudinal axis of machine bed 1b but laying in the leftmost position as viewed in FIG. 2.

Next in step No. 2, the fabric 49 of an area stretched between frame 9 is photographed by video camera 16, and then in step No. 3 the photographed image is projected on field 51.

Next in step No. 4, arrangement of the selected series of characters "KENT" will be determined by operation of either one of touch keys 45 and 46 shown on display 14. In this specific example, it is assumed that the selected series of characters "KENT" be arranged on the straight along the upper edge of pocket 50 of the fabric 49, as particularly seen in FIG. 6.

Next in steps No. 5 and No. 6, whether the selected character series be arranged on the straight or in arcs is discriminated. Since the straight arrangement has been designated in step No. 4 in this specific example, the process goes forward to step No. 7 wherein a position to be stitched is designated by operation of one of positioning keys 42, 43 and 44. When the straight arrangement has been designated, either one of "START" key 42 and "END" key 44 must be operated, which is discriminated in steps No. 8 and No. 11.

When "START" key 42 has been operated in step No. 7, in step No. 9, a starting point P (FIG. 6) on the fabric 49 seen in field 41, from which stitching operation for producing the selected character series should be commenced, is plotted by using light pen 15. The coordinates of the plotted starting point P is stored in first RAM 19 in next step No. 10. Likewise, when "END" key 44 has been operated in step No. 7, an ending point Q is plotted in step No. 12 and then stored in first RAM 19 in step No. 13.

Figure 5:
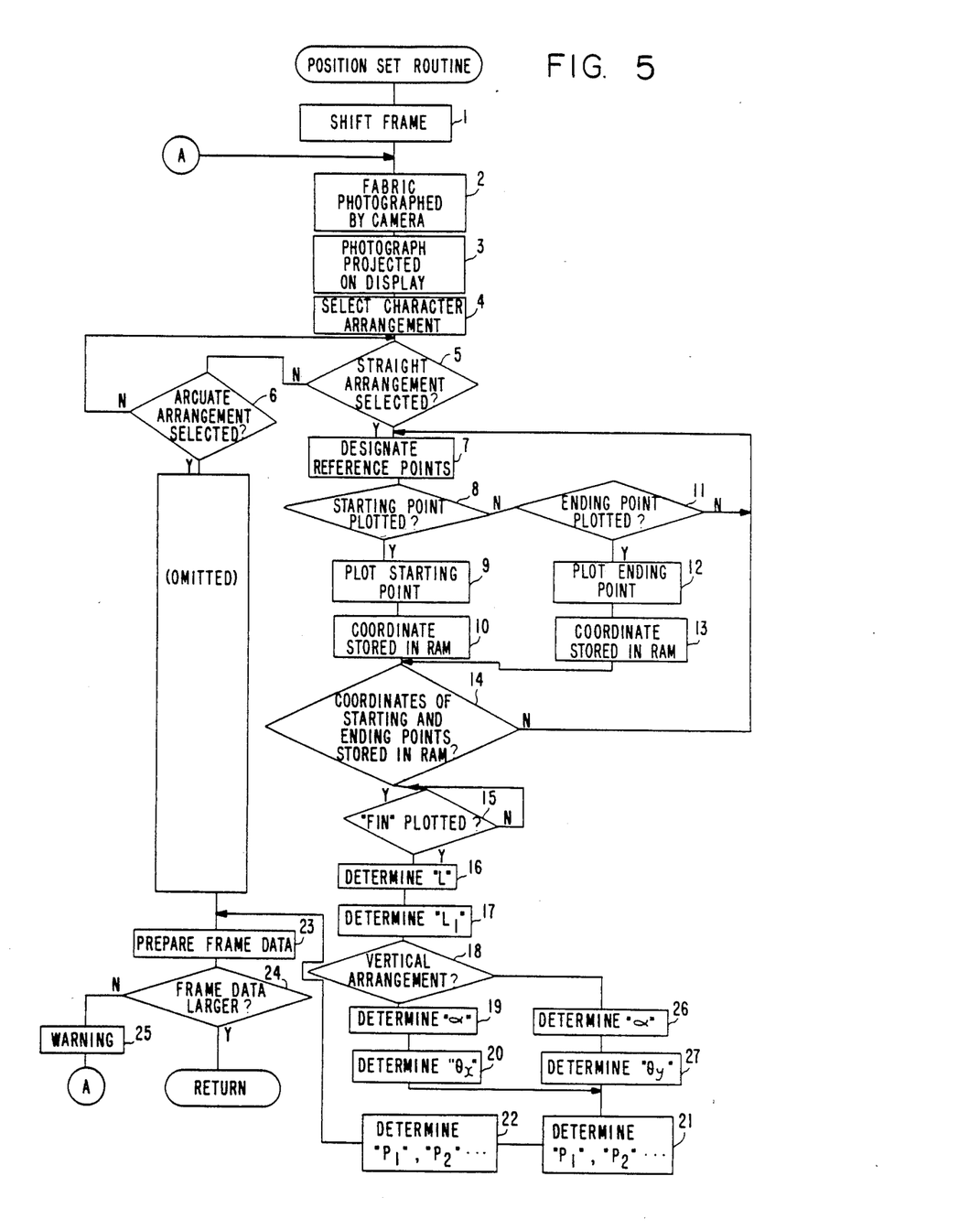
FIG. 5 is a flow chart of the embroidery position set routine.

Next in step No. 14, whether the coordinates of starting point or ending point has been stored in first RAM 19 is discriminated. If not, the process returns to the input of step No. 7. If YES, the process remains on standby until "FIN" key 39 is plotted, which is discriminated in next step No. 15. If erroneous data has been input in the preceeding step, "CORRECT" key 48 is plotted followed by input of another data in first RAM 19. Such correction procedure is less concerned with characteristic features of this invention and therefore is not described in detail nor shown in the flow chart of FIG. 5.

After plotting "FIN" key 39, next in step No. 16, the coordinates of the starting point P and the ending point Q are read out from first RAM 19 to calculate an overall length (L) therebetween. Then in step No. 17, the overall length (L) is divided by a number of characters (N) constituting the selected character series to obtain an unit length ($L_1$) assignable to each character.

In step No. 18, it is determined whether the selected character series should be arranged in a horizontal direction or in a vertical direction. When the horizontal arrangement is designated, then in step No. 19, the unit length ($L_1$) is divided by a standard character width (Ws) to obtain a coefficient ($\alpha$). The standard character width (Ws) can be determined by the peripheral reference data included in the embroidery control data stored in ROM card 12, which will be common to the respective characters. This coefficient ($\alpha$) means a rate of magnification or reduction with respect to the standard size of the character. Next in step No. 20, an inclination angle ($\theta$x) of the character arrangement is obtained from the coordinates of the starting and ending points P and Q. Next in step No. 21, standard points $P_1$, $P_2$, ... for the respective characters will be determined from the previously determined data.

Next in step No. 22, by the embroidery data stored in first RAM 19 for producing the character of a standard size is converted into another data with the rate of magnification or reduction ($\alpha$) which has been calculated in step No. 19, and with the inclination angle ($\theta$x) which has been calculated in step No. 20. The data thus obtained will now become suitable for producing the selected character series arranged just between the designated starting and ending points P and Q. The converted data will again stored in first RAM 19.

Next in step No. 23, the frame data representing an area in field 51 is obtained, which will then be compared with the converted data obtained in step No. 22. If the former data is larger than the latter, meaning that the selected character series to be produced in accordance with the said converted data will surely be produced on the fabric of a specific area stretched between embroidery frame 9, the procedure returns so that the respective embroidery data are read out from first RAM 19, which will be cooperated with the embroidery stitch control program stored in ROM 18 to produce the stitch control data for each stitch, which will then be stored in second RAM 22. Now the embroidering machine will become operatable so that by manipulation of a start switch 30 (FIG. 2) arranged on machine housing 1, the stitch control data is read out from second RAM 22 to step-wise drive stepping motors 20 and 21, thereby producing the selected character series in the designated arrangement.

If in step No. 24 it is discriminated that the frame data is smaller than the converted data representing the overall size of the selected character series to be actually produced in the stretched area of the fabric, a warning appears in display 14 in step No. 25. In this case, a sequence of procedures starting from step No. 2 should be tried again.

Figure 8:
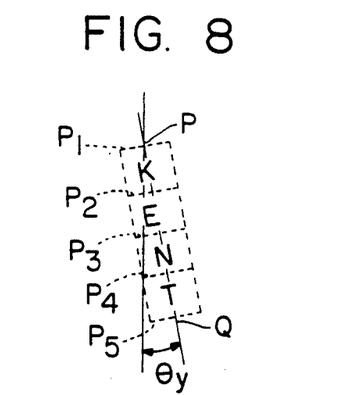
FIG. 8 is an explanatory view showing a manner in which the character series is produced in a vertical arrangement.

When the selected character series are to be produced in a vertical arrangement as shown by FIG. 8, which is discriminated in step No. 18, next in step No. 26, the unit length ($L_1$) is divided by the standard character height (Hs) to obtain a magnification or reduction rate ($\alpha$). Then in step No. 27, the inclination angle ($\theta$y) of the selected character series with respect to the vertical reference line will be determined. Procedure is then go forward to step No. 21.

When the selected character series is to be produced in an arcuate arrangement, operation of "ARC" key 46 can be discriminated in step No. 5 to proceed to step No. 6. Although the succeeding steps are omitted in the flow chart of FIG. 5, it will be understood that a similar procedure is taken except that in a step corresponding to step No. 7, a point designating the apex of the arc should be designated by key manipulation as well as the starting and ending points of the arc.

Figure 10:
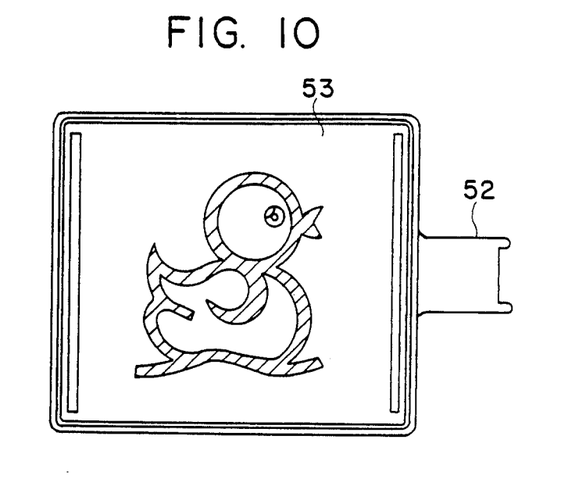
FIG. 10 is a plan view showing an image input frame for use in the image input operation.
Figure 11:
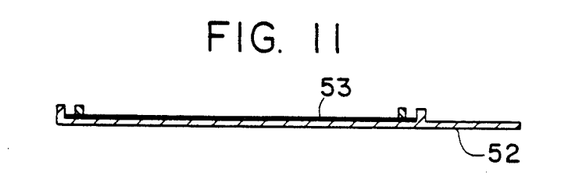
FIG. 11 is a side view of the image input frame.

The embroidering machine is also adapted to produce embroidery stitch patterns of original images. For this purpose, embroidery frame 9 is detached from the machine and replaced by an image input frame 52. As specifically shown in FIGS. 10 and 11, image input frame 52 has a configuration substantially identical to embroidery frame 9 and is designed to be detachable to supporting member 10. By way of a nonlimiting specific example, an original image illustrating a chick 53 is in advance drawn on image input frame 52. To device 11 is inserted a memory card or RAM card 60 for storing therein data required to reproduce the image on frame 52.

By manipulation of mode select key in display 14, an image input mode can be selected. Although the original picture of chick 53 is seen in field 51 in FIG. 12, it should be understood that no image can yet be seen at this beginning stage of an image input procedure. As shown, "DELETE" 54, "PAINT" 55, "START" 56, "END" 57, "ORDER" 58 and "FIN" 59 keys will now appear in display 14 of the image input mode. A photograph is taken by camera 16 and projected onto field 51, as in the embroidery position set mode.

Figure 9:
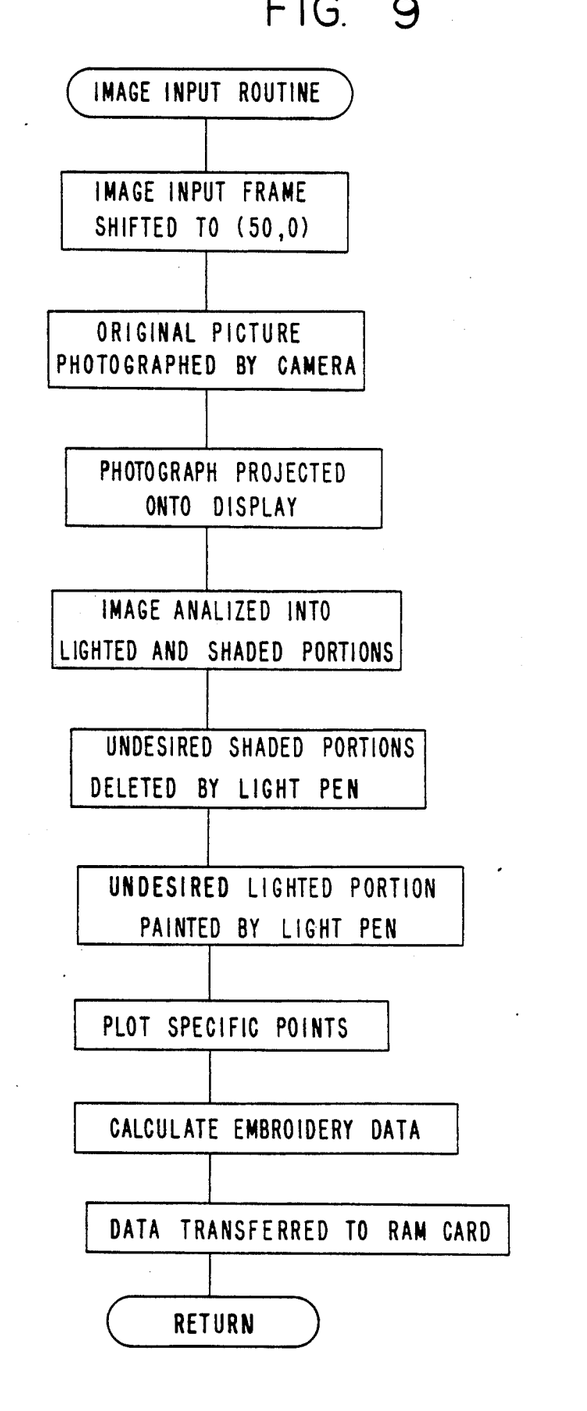
FIG. 9 is a flow chart of the image input routine.
Figure 12:
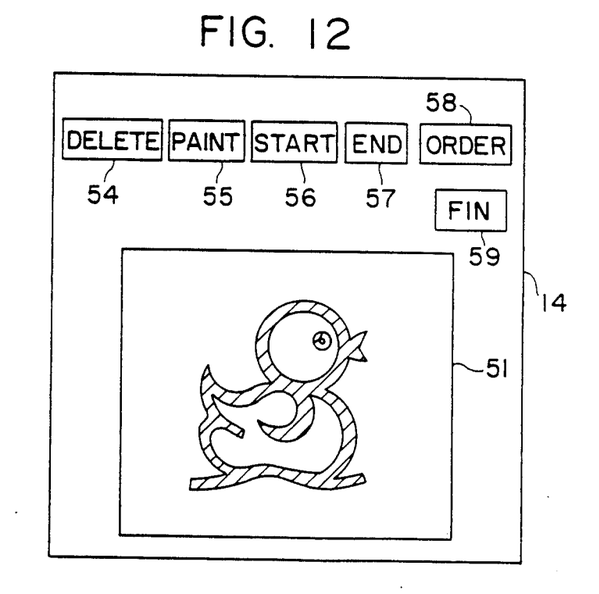
FIG. 12 is a plan view showing a display section which can be seen in the image input mode.

Now the procedure for reproducing an original image on the fabric will be described in reference to a flow chart in FIG. 9. This image input routine starts from shifting of image input frame 52 to a predetermined position, that is the leftmost position having coordinates of (50, 0), as in step No. 1 in the embroidery position set mode procedure, whereby image input frame 52 is positioned below camera 16. An original picture 53 of the chick image drawn on input frame 52 is photographed by camera 16 to be projected onto field 51 of display 14, as can be seen in FIG. 12. Next, the picture seen in field 51 is analyzed to divide into lighted portions and shaded portions (shown in FIGS. 10 and 12 as cross-hatched). Only the shaded portions will be stitched with the embroidering machine. When analyzing the picture in field 51 to draw a corresponding picture consisting of lighted and shaded portions, it may be possible that some portion not to be stitched is seen as a shaded portion or some portion to be stitched is seen as a lighted portion. The former should be deleted by plotting "DELETE" key 54 followed by tracing it with light pen 15, whereas the latter be shaded by plotting "PAINT" key 55 followed by painting or tracing as desired.

After the picture has been completely reproduced in field 51, "START" key 56 is designated and a starting point from which the stitching operation should begin is designated by using light pen 15, whereby the coordinates of the starting point thus designated is stored in first RAM 19. Then, by operation of "ORDER" key 58 followed by successively plotting sufficient stitch points to define the curvature and bounds of stitching, called the knuckled portions lying on the peripheral boundary of the proposed embroidery pattern, the embroidery data determining the boundaries of the pattern to be produced can be stored in first RAM 19. The peripheral boundary of the pattern can be designated in any known manner. Then, in the like manner as in designation of the starting point, "END" key 57 is plotted and an ending point of the pattern is designated so that its coordinates stored in first RAM 19. After that, "FIN" key 59 is plotted. Thus, the embroidery data can be prepared by the program stored in ROM 18 based on the previously determined data of coordinates stored in first RAM 19. The embroidery data thus prepared and another data representing a reduction rate will then be transferred to RAM card 60 and stored therein. The stitching operation will be performed based on the data stored in RAM card 60 substantially in the conventional manner and therefore is not described herein in more detail.

Figure 13:
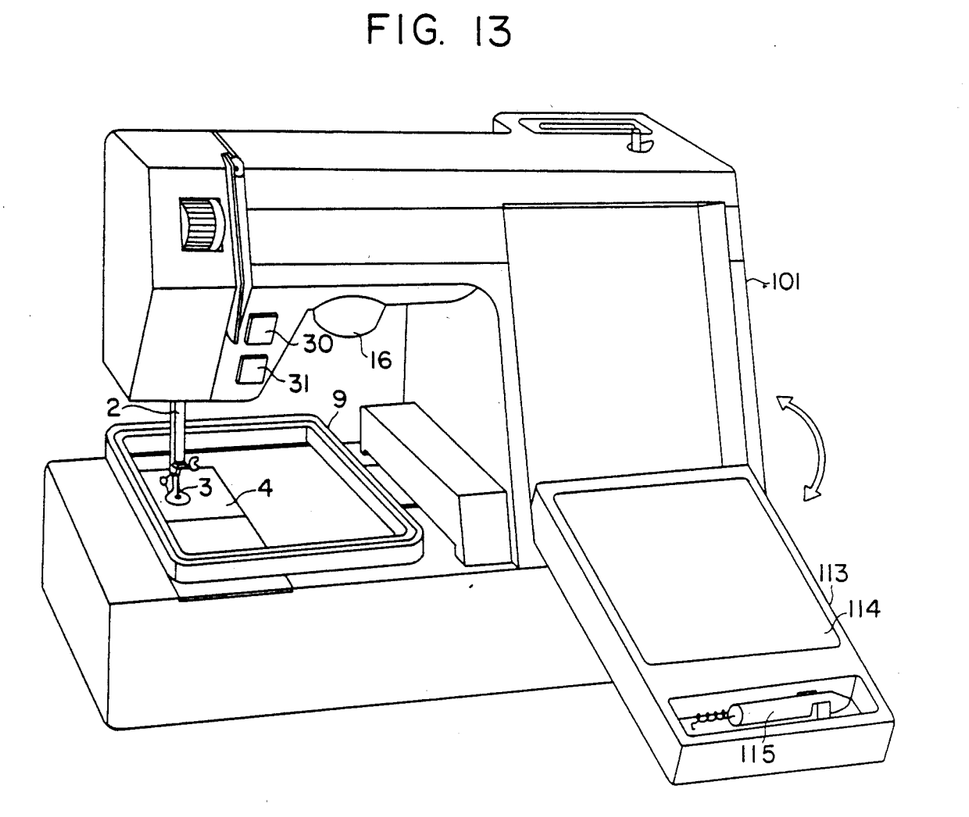
FIG. 13 is a perspective view illustrating another embodiment of the invention.

Although the invention has been described in conjunction with a specific embodiment thereof, it should be understood that the invention is not limited thereto and many modifications and variations may be made without departing from spirits and scope of the invention as defined in the appended claims. For example, in the illustrated embodiment the input operation board 13 is designed such that it can be retracted within machine bed 1b, which may be replaced by a hinged panel 113 as seen in FIG. 13, which can be retracted within a recess formed in the upstanding machine base to provide a smooth surface in the retracted position but can be pulled down in use. The upper or inner side of panel 113 is provided with a display 114 and a light pen 15. In the image input mode, a colorful image can be produced by further designating points at which a previously used thread having a specific color should be exchanged to another thread having a different color.

What is claimed is:

1. In an embroidering machine having a machine housing, a vertically reciprocated needle supported by the machine housing and carrying a thread, a thread loop-taker cooperating with the needle to form a stitch on a fabric, an embroidery frame for supporting the fabric, means for shifting the embroidery frame with respect to the needle, and memory means for storing embroidery stitch control data for a plurality of patterns including character patterns, the data being selectively and sequentially read out from the memory means to drive the frame shifting means to thereby produce stitches of a selected pattern, the improvement which further comprises;

camera means mounted on the machine housing in opposition to said embroidery frame for taking a picture of the fabric stretched between said embroidery frame, said picture representing the positional relationship between the fabric and the needle;

a graphic display connected to the machine housing, said graphic display being operatable in a first operation mode to display a list of stitchable patterns, and alternatively said graphic display being operatable in a second operation mode to display the picture taken by said camera means; and signal generating means cooperating with said graphic display so that one or more of desired characters shown on said display can be selected when said graphic display is in said first operation mode, and specific points on the graphic display of the fabric stretched on the embroidery frame to be stitched can be designated to define boundaries of the actual stitching when in said second operation mode.

2. The embroidering machine according to claim 1 wherein said graphic display is retractable within the machine housing.

3. In an embroidering machine having a machine housing, a vertically reciprocated needle supported by the machine housing and carrying a thread, a thread loop-taker cooperating with the needle to form a stitch on a fabric, an embroidery frame for supporting the fabric, means for shifting the embroidery frame with respect to the needle, and memory means for storing embroidery stitch control data for a plurality of patterns including character patterns, the data being selectively and sequentially read out from the memory means to drive the frame shifting means to thereby produce stitches of a selected pattern, the improvement which further comprises;

an image input frame having a configuration corresponding to the embroidery frame and replaceable therewith, but designed to carry a picture desired to be embroidered on the fabric in the embroidery frame;

camera means mounted on the machine housing in opposition to said image input frame attached to the machine housing for taking a photograph of the picture, said photograph representing relative position data between the picture and the needle;

a graphic display connected to the machine housing, for displaying thereon said relative position data between the picture and the needle and capable of reproducing a picture on the image input frame; and signal generating means cooperating with said graphic display so that sufficient stitch boundary points to define curvature and bounds of the stitching for reproducing the picture on the fabric can be defined in terms of the coordinates of the display and therefore the embroidery frame.

4. The embroidering machine according to claim 3 wherein said graphic display is arranged on a deck or panel retractable within the machine housing.

* * * * *